(12) United States Patent
Kirol et al.

(10) Patent No.: US 6,385,993 B1
(45) Date of Patent: May 14, 2002

(54) MULTIPLE COLUMN GENERATOR FOR AQUA-AMMONIA ABSORPTION SYSTEM

(75) Inventors: Lance D. Kirol, Morrisville, VT (US); Paul Sarkisian, Boulder City, NV (US); Uwe Rockenfeller, Boulder City, NV (US); William T. Dooley, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/632,053

(22) Filed: Aug. 3, 2000

(51) Int. Cl.[7] .................................................. F25B 15/00
(52) U.S. Cl. ............................. 62/476; 62/484; 62/101
(58) Field of Search ........................... 62/476, 101, 484, 62/103, 141, 485, 497

(56) References Cited

U.S. PATENT DOCUMENTS

| | | | |
|---|---|---|---|
| 4,270,365 A | * 6/1981 | Sampietro | 62/238.3 |
| 5,255,528 A | 10/1993 | Dao | 62/101 |
| 5,367,884 A | 11/1994 | Phillips et al. | |
| 5,490,393 A | 2/1996 | Fuesting et al. | |
| 5,548,971 A | 8/1996 | Rockenfeller et al. | |
| 5,771,710 A | * 6/1998 | Erickson | 62/476 X |
| 5,966,948 A | * 10/1999 | Anand | 62/101 |

FOREIGN PATENT DOCUMENTS

DE        198 42 577 A1    3/2000

* cited by examiner

*Primary Examiner*—Henry Bennett
*Assistant Examiner*—Chen-Wen Jiang
(74) *Attorney, Agent, or Firm*—Knobbe, Martens, Olson & Bear, LLP

(57) ABSTRACT

An aqua-ammonia absorption apparatus generator assembly comprising a boiler section, a solution-heated-desorber section, and adiabatic desorber or GAX desorber section, and a rectifier section, incorporates a plurality of columns, each column comprising one or more of the sections, with the columns arranged so that the lowest end of a first column is lower than the top end of a second column, and uses one or more eductors driven by a feed stream from the absorber for pumping liquid refrigerant from the bottom of a lower temperature column to the top of the next hotter column.

9 Claims, 2 Drawing Sheets

MULTIPLE COLUMN GENERATOR FOR AQUA-AMMONIA ABSORPTION SYSTEM

BACKGROUND OF THE INVENTION

Aqua-ammonia absorption systems incorporate, as the major components, an absorber, generator, condenser, and an evaporator. Such systems, well known in the art, are disclosed, for example, in U.S. Pat. Nos. 5,548,971, 5,367,884, and 5,490,393 the descriptions of which, including system components, features and operation, are incorporated herein by reference. These aqua-ammonia absorption systems may be designed and operated as heat pumps, refrigeration equipment, chillers, heating appliances, and chiller-heaters.

The generator of an aqua-ammonia absorption system operates as a distillation column and includes, as components, a boiler, a stripping section or stripper, and a rectifying section. The composition feed to the generator comprising an ammonia rich liquor from the system absorber, is introduced to the generator at one or more feed or inlet points. The boiler is designed to produce liquid and vapor counter-flow coincident with heat input. Prime heat is introduced over a finite length or height of the boiler resulting in significant change in ammonia concentration in the area of heat input. In some systems, the boiler is replaced by a reboiler in which heat is input from a prime energy source but with no substantial ammonia separation other than from vapor separating in equilibrium from the liquid near the bottom of the column. Thus, a reboiler simply returns vapor to the generator column.

The stripping section comprises all sections of the generator column which are below the highest (coldest) feed point. In the stripping section, heat is recovered from solution leaving the bottom of the distillation column with the recovered heat returned to the portion of the column above the boiler. The stripping section comprises three portions: a solution-heated desorber (SHD) and either an adiabatic desorber or a generator-absorber heat exchange (GAX) desorber, and the boiler. The SHD is that portion of the stripping section which extracts heat from weak solution, i.e., solution from the bottom of the generator column, before the weak solution is routed to the absorber. The adiabatic desorber of the stripping section has no heat input and is typically located between the coldest feed point and the SHD. The GAX desorber receives heat from the absorber, either by heat transfer using weak liquor from the bottom of the generator column or a secondary fluid. Typically, a generator in a GAX aqua-ammonia absorption system will have a GAX desorber or an adiabatic desorber, but not both. When the system utilizes strong liquor GAX an adiabatic section is used, whereas a GAX desorber is used for weak liquor GAX or secondary fluid GAX. An additional component of a generator is a rectifier which is the section of the generator above the highest (coldest) feed point. Such generators as described above are illustrated in the drawings and will be described in further detail hereinafter.

The feed to the generator column from the system absorber is a rich liquor comprising a solution having a comparatively high ammonia content. Such rich liquor typically has 40% to 50% ammonia, but under some operating conditions may be as low as about 20%. Such a rich liquor is contrasted to a weak liquor directed from the generator to the absorber, which comprises a water-rich composition having between about 1% and about 15% ammonia at rating conditions, and typically between about 3% and about 5% ammonia. In conventional strong-liquor GAX absorption cycles, heat is recovered by passing a portion of the strong liquor through a heat exchanger in the GAX absorber, and heating the solution above its bubble point so that it becomes a two phase mixture. The portion of the strong liquor not passed through the GAX heat exchanger is introduced into the generator at or near the bottom of the rectifier as a single-phase liquid at or below the bubble point temperature. The second feed stream to the generator is that portion of the strong liquor which is passed through the GAX absorber. The second feed stream, comprising liquid and vapor, is introduced into the generator at a lower location than the first single-phase liquid feed. Conventional generators used in the aforesaid aqua-ammonia absorption systems have placed all the sections of the generator below the rectifier into a single shell, or multiple shells oriented one above the other such that they operated by gravity driving flow of liquid down the column from one section to the next. In some cases the rectifier is also positioned above the remainder of the generator (either in a separate shell or the same shell). In conventional systems wherein the rectifier was not placed completely higher than the remainder of the generator, a bubble pump, also know as a vapor-lift pump, has been used to pump liquid from the bottom of the rectifier to the top of the remainder of the generator.

SUMMARY OF THE INVENTION

The improved generator of the present invention is divided into a plurality of columns arranged so that the bottom of a lower temperature column is lower than the top of a higher temperature column. Eductors driven by feed streams are used to pump liquid from the bottom of one column to the top of the next column. In another embodiment of the invention, a separate rectifier section column is used with liquid from the rectifier directed to the inlet of the absorption system solution pump and pumped by the solution pump to the top of the stripping section column.

DETAILED DESCRIPTION OF THE PREFERRED EMBODIMENTS

In the present invention, an improved aqua-ammonia absorption system generator uses a plurality of columns, each column composed of one or more generator sections, the columns arranged generally at the same elevation so that the lowest end of one column is lower than the upper end of another column.

Figure 1:
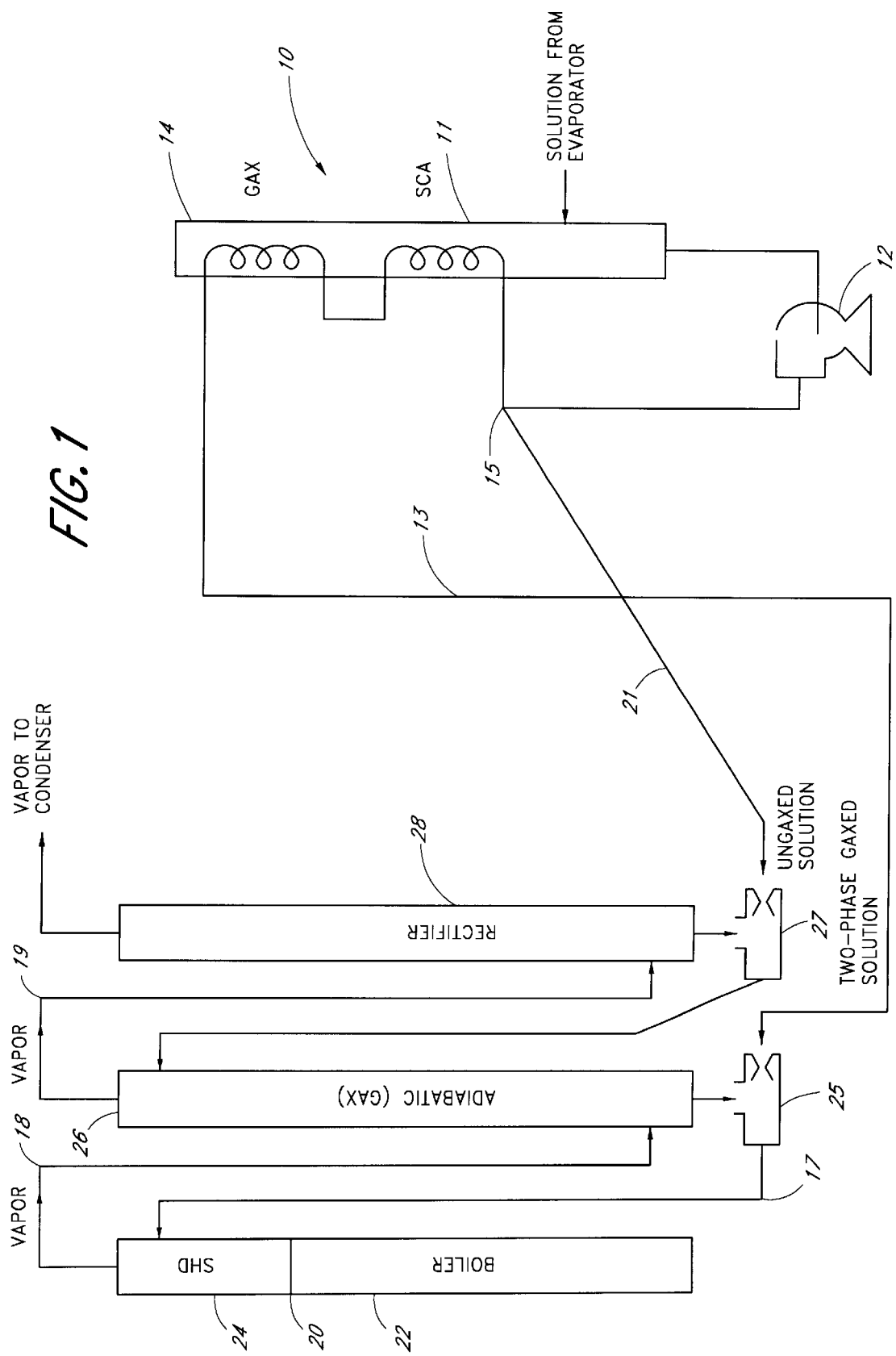
FIG. 1 is a schematic illustration of a generator assembly of the invention comprising a plurality of columns and feed stream driven eductors.
Figure 2:
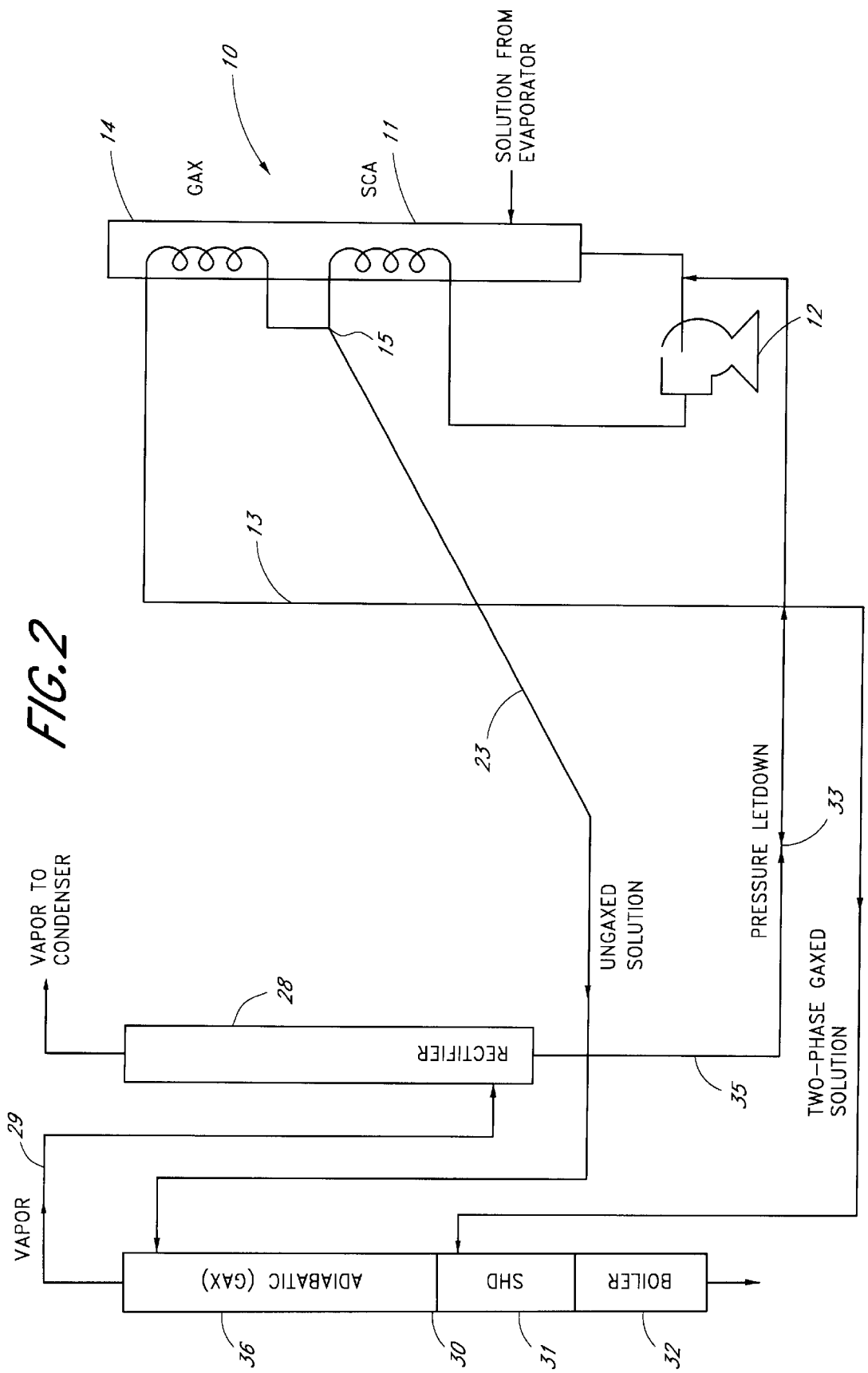
FIG. 2 illustrates another embodiment of the invention in which the rectifier is in a separate column and using the system solution pump for pumping liquid from the bottom of the rectifier section to the other generator sections.

In the aqua-ammonia absorption system illustrated in FIG. 1, an absorber 10 includes a solution-cooled absorber (SCA) heat exchange section 11 and a generator-absorber heat exchange (GAX) section 14. Rich liquor flowing from the absorber to the generator is split so only a portion of the flow is through the heat exchanger in the GAX absorber section. FIG. 1 shows the flow being split at flow splitter 15 before the SCA, but flow may also be split after the SCA as shown in FIG. 2. Strong liquor from the solution pump 12 may also pass through the heat exchange coils of a solution-cooled rectifier before being routed to the SCA. Solution not passing through the GAX heat exchanger is directed through pipe 21 to eductor 27 and then to the adiabatic generator section 26. That portion of fluid passing through the GAX heat exchanger 14 is directed by pipe 13 to eductor 25, and then to the solution-heated desorber section 24 of the generator. In the embodiment shown, the rectifier 28 and adiabatic section 26 are in separate columns, while boiler 22 and SHD section 24 are located in a third column 20. The three columns are arranged so that the bottom of the lowest temperature column 28 is lower than the top of the next hotter column 26, and the bottom of column 26 is lower than the top of hottest column 20. Thus, it is necessary to pump liquid from the bottom of a colder column to the top of the next warmer column so that liquid continues to flow from the coolest to the hottest sections. Different combinations of columns may also be used. For example, two generator columns may be used with the adiabatic desorber and rectifier sections in a single column and the boiler and SHD in a separate column. In another alternative, a separate column may be used for the boiler and SHD sections, with a second column for an adiabatic section or a GAX desorber section. In the embodiment illustrated, second column 26 may be either the adiabatic section or the GAX desorber section, depending on the desired function of the apparatus. As illustrated, the several columns may be conveniently mounted or positioned at approximately the same elevation, i.e., generally horizontal to one another. The columns are to be split or separated at the feed points, i.e., the point along the length of a generator where the feed stream is to be introduced. The columns need not be broken at both feed points if there is no requirement for a shorter column that can be achieved with one break.

It is necessary to pump liquid from the bottom of each column to the top of the next column, so liquid continues to flow "down" the column from the coldest to the hottest sections. Some residential and commercial aqua ammonia appliances built in the past have accomplished such pumping with bubble pumps (also called vapor-lift pumps). However, according to the present invention, eductors, sometimes referred to as jet pumps, ejectors, or aspirators, are used to pump liquid from one column to the top of the next using the feed liquid as the motive force. Strong-liquor implementation of GAX has two feed streams to the generator, allowing two eductors and two break points in the generator using three columns. Other GAX methods such as weak liquor and secondary fluid heat transfer, as well as aqua-ammonia systems not using GAX, have one feed stream to the generator, allowing one eductor and one break point using two columns. In both cases, the feed stream itself is used to provide motive force for pumping liquid. The feed stream for driving each eductor is introduced into the column at or adjacent to the end of the column where the generator is split.

The use of the eductors also requires that the respective columns are split at the points at which feed is introduced into the column. Thus, the length and end of each column is dictated by the desired feed point of the respective column sections. In addition, each eductor is positioned below a column section so that liquid from a column section gravitationally flows into the eductor where it is fed along with a liquid feed stream. As shown, unGAXed feed drives eductor 27 which directs the feed stream from absorber 10 along with liquid from the bottom of rectifier column 28 to the top of the adiabatic or GAX section column 26. Eductor 25 is driven by GAXed solution feed stream from the GAX section of absorber 10, which solution is directed via pipe 17 along with liquid feed from the bottom of section 26 to the top of the SHD section at the top of column 20.

In the embodiment of the invention illustrated in FIG. 2, the rectifier is a separate section, and liquid from the bottom of the rectifier column is fed to the system solution pump 12 and from there is pumped to the top of the next column. As shown in FIG. 2, liquid from the bottom of the rectifier column 28 is fed to the inlet of solution pump 12 where it is pumped, along with solution from the absorber, to the top of column 30 via flow splitter 15 and piping 23. Again, the rest of the generator sections may be in one or more separate columns.

The column split may be between the rectifier and the adiabatic or GAX sections, as shown, with the rest of the generator sections, adiabatic or GAX section 36, SHD section 31, and boiler section 32 contained in a second column 30, or a split between the adiabatic and SHD sections such as shown in FIG. 1. In either configuration, the existing solution pump of the system is used to pump the rectifier liquid and absorber solution to the top of the next hotter section. Where a third column is used, as described above and shown in FIG. 1, an eductor 25 driven by the two-phase feed stream which has passed through the GAX heat exchanger, pumps liquid from the second column, i.e., the adiabatic or GAX section, to the top of the third column, i.e., the SHD section. FIG. 2 also illustrates a pressure letdown device 33 in the piping 35 from the rectifier 28 to the solution pump 12. Such a letdown device is needed in the line to reduce the higher rectifier pressure to the pressure of the solution pump inlet. A suitable pressure letdown device may be an orifice, capillary tube, valve or the like.

The use of multiple columns reduces the overall height of the generator, thereby improving packaging and providing for a variety of system designs with spatial (height) advantages. Moreover, the use of eductors driven by liquid feed instead of bubble pumps eliminates the energy penalty required to generate vapor necessary to drive the bubble pump. These as well as other advantages of the invention will be evident to those skilled in the art.

What is claimed is:

1. An aqua-ammonia absorption apparatus comprising an absorber assembly, a generator assembly, a condenser and an evaporator, said generator assembly comprising a boiler section, a solution-heated-desorber section, an adiabatic desorber or GAX desorber section, and a rectifier section, wherein said generator assembly comprises a plurality of columns, each column comprising one or more of said sections, said columns arranged so that the lowest end of a first column is lower than the top end of a second column, and one or more eductors driven by a feed stream from the absorber for pumping liquid refrigerant from the bottom of a lower temperature column to the top of the next hotter column.

2. Apparatus of claim 1 comprising a first column containing said boiler, solution-heated desorber and adiabatic or GAX desorber sections and a second column containing said rectifier section.

3. Apparatus of claim 1 comprising a first column containing said boiler and solution-heated-desorber sections and a second column containing said adiabatic or GAX desorber and rectifier sections.

4. Apparatus of claim 1 comprising a first column containing said boiler and solution-heated-desorber sections, a second column containing said adiabatic or GAX desorber section, and a third column containing said rectifier section.

5. Apparatus of claim 1, 2, 3 or 4 including a pump for pumping a liquid feed stream from the absorber to said one or more eductors.

6. An aqua-ammonia absorption apparatus comprising an absorber assembly, a generator assembly, a condenser and an evaporator, said generator assembly comprising a plurality of columns, a first column comprising a rectifier, and the other of said plurality of columns comprising a boiler, a solution-heated desorber, and an adiabatic desorber or a GAX desorber section, said columns arranged such that the bottom of the first column is lower than the top of a second column, said apparatus including a solution pump for pumping liquid solution therein, and first piping for directing liquid from the bottom of the fist column to the inlet of the solution pump and second piping for directing liquid solution from the solution pump to the top of the second column.

7. Apparatus of claim 6 wherein said absorber assembly comprises an absorber and a GAX absorber heat exchanger and wherein a strong liquor absorption solution is partially vaporized in said GAX absorber heat exchanger, said apparatus including third piping for directing liquid solution from the solution pump to the GAX absorber heat exchanger and therefrom to the solution-heated desorber.

8. Apparatus of claim 7 including a flow splitter cooperating with said second and third piping for dividing liquid pumped from said solution pump between said second and said third piping.

9. The apparatus of claim 6 wherein said absorber assembly comprises an absorber and a GAX absorber heat exchanger and wherein said generator assembly comprises three columns, the second column containing an adiabatic or GAX desorber section and a third column containing the boiler and solution-heated-desorber sections, and including an eductor driven by a feed stream which has passed through the GAX absorber heat exchanger for pumping liquid from the bottom of the second column to the top of the third column.

* * * * *